United States Patent [19]

Ritzau et al.

[11] Patent Number: 4,494,270
[45] Date of Patent: Jan. 22, 1985

[54] VACUUM CLEANER WAND

[75] Inventors: William P. Ritzau, Old Greenwich; Aveo J. Casselli, Norwalk, both of Conn.; Gene S. Fleischer, Spring Valley, N.Y.

[73] Assignee: Electrolux Corporation, Stamford, Conn.

[21] Appl. No.: 478,887

[22] Filed: Mar. 25, 1983

[51] Int. Cl.³ ............................................. A47L 9/24
[52] U.S. Cl. ..................................... 15/377; 174/47; 285/7; 285/317; 339/16 R
[58] Field of Search ................ 15/377; 174/47; 285/7; 285/317; 339/16 R

[56] References Cited

U.S. PATENT DOCUMENTS

| | | |
|---|---|---|
| 409,512 | 8/1889 | Smith . |
| 1,115,989 | 11/1914 | Thurman . |
| 1,847,379 | 3/1932 | Buchet . |
| 1,940,244 | 12/1933 | Carlstedt . |
| 2,064,397 | 12/1936 | White .................................. 285/174 |
| 2,102,802 | 12/1937 | Lofgren ............................... 285/174 |
| 2,125,477 | 8/1938 | Whitney .............................. 285/174 |
| 2,146,252 | 2/1939 | Ell ........................................ 285/169 |
| 2,150,765 | 3/1939 | Forsberg ............................. 285/174 |
| 2,184,881 | 12/1939 | Martinet ............................. 285/170 |
| 2,196,459 | 4/1940 | Forsberg ............................. 285/199 |
| 2,260,263 | 10/1941 | Röber ................................... 131/105 |
| 2,461,024 | 2/1949 | Baumgardner .................... 285/173 |
| 2,582,446 | 1/1952 | Martinet ............................. 285/174 |
| 2,681,807 | 6/1954 | Krafft .................................... 279/29 |
| 2,755,106 | 7/1956 | Brennan et al. ...................... 285/7 |
| 2,806,723 | 9/1957 | Fairclough .......................... 287/58 |
| 2,885,223 | 5/1959 | Duff ........................................ 285/7 |
| 2,912,260 | 11/1959 | Wray ...................................... 285/7 |
| 2,925,289 | 2/1960 | Brown, Jr. et al. ................... 285/7 |
| 2,951,714 | 9/1960 | Carlberg ................................ 285/7 |
| 3,049,367 | 8/1962 | Lashta .................................... 285/7 |
| 3,159,412 | 12/1964 | Descarries ............................. 285/7 |
| 3,534,317 | 10/1970 | Descarries et al. ................... 339/7 |
| 3,553,629 | 1/1971 | Brown et al. ........................ 339/15 |
| 4,050,113 | 9/1977 | Wright et al. ....................... 15/315 |
| 4,079,965 | 3/1978 | Moughty et al. ..................... 285/7 |
| 4,188,081 | 2/1980 | Holden et al. ...................... 339/15 |
| 4,235,461 | 11/1980 | Normark ............................. 285/340 |

FOREIGN PATENT DOCUMENTS

| | | |
|---|---|---|
| 651327 | 10/1937 | Fed. Rep. of Germany . |
| 1564201 | 4/1969 | France . |
| 2298305 | 8/1976 | France . |
| 1258817 | 12/1971 | United Kingdom . |

*Primary Examiner*—Chris K. Moore
*Attorney, Agent, or Firm*—Jeffrey H. Ingerman

[57] ABSTRACT

An improved wand for connecting a vacuum cleaner and power nozzle is disclosed. The wand includes a sheath, an upper wand assembly received in the sheath and detachably connected to the vacuum cleaner hose handle, and a lower wand assembly received in the sheath and releasably connected therein to the upper wand assembly. A resilient plug body is provided for attachment to the hose handle to be connected to the cord of the sheath. The plug body contains at least two electrical connectors separated by a slit to provide a limited degree of flexibility in the plug body to insure a good connection despite any possible minor misalignment with the opposing connectors on the cord. The upper end of the lower wand assembly has a leaf spring with a button on its underside protruding through a hole in the lower wand assembly to engage a similar hole in the upper wand assembly. The sheath has an axially slidable cam element for sliding under and raising the free end of the spring another version, the wand assemblies are connected by means of an omega spring in the upper assembly having a button protruding through holes in both assemblies. In this version, the sheath has a depressable release element having an S-spring on its underside to depress the omega spring and release the lower assembly.

8 Claims, 10 Drawing Figures

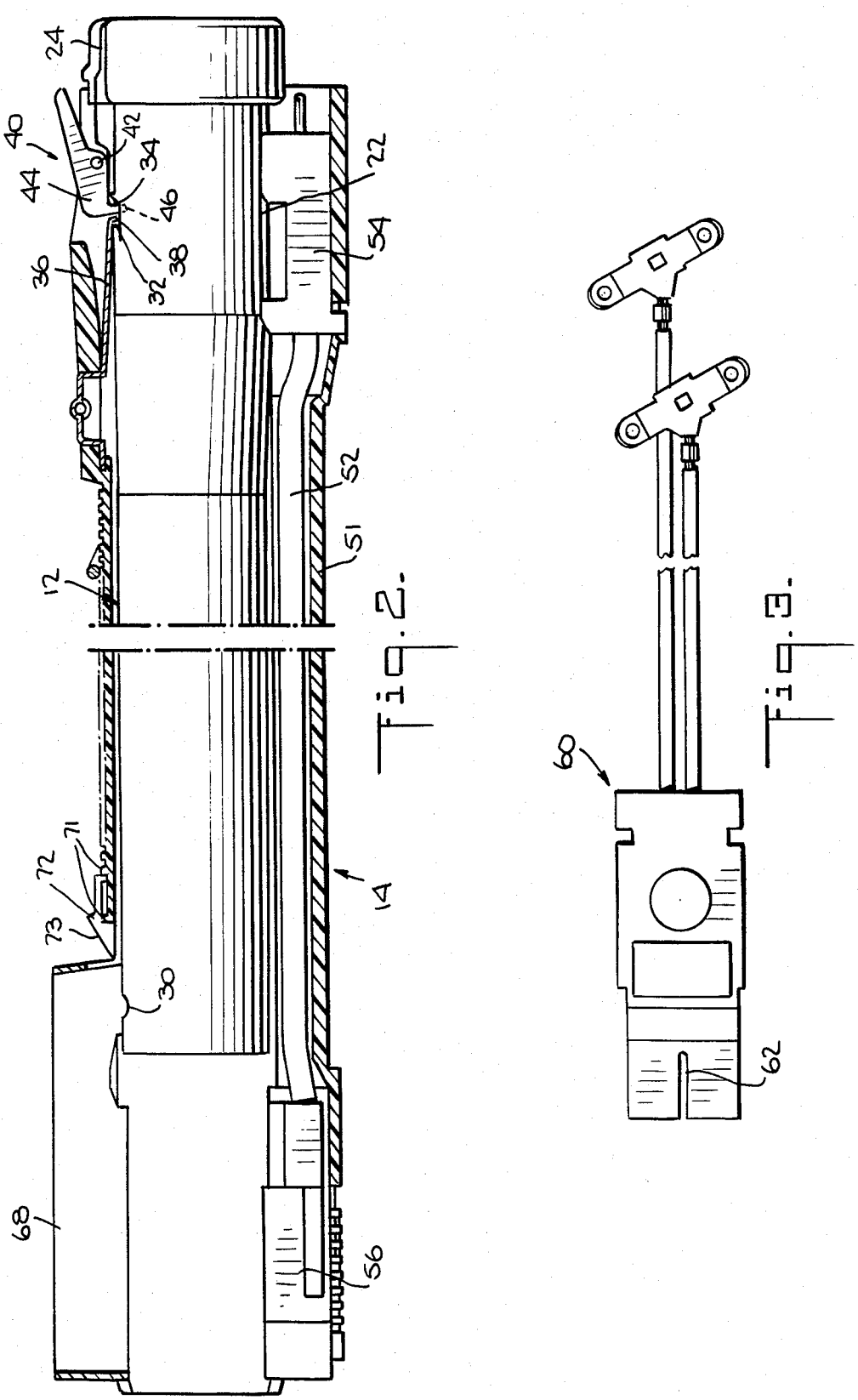

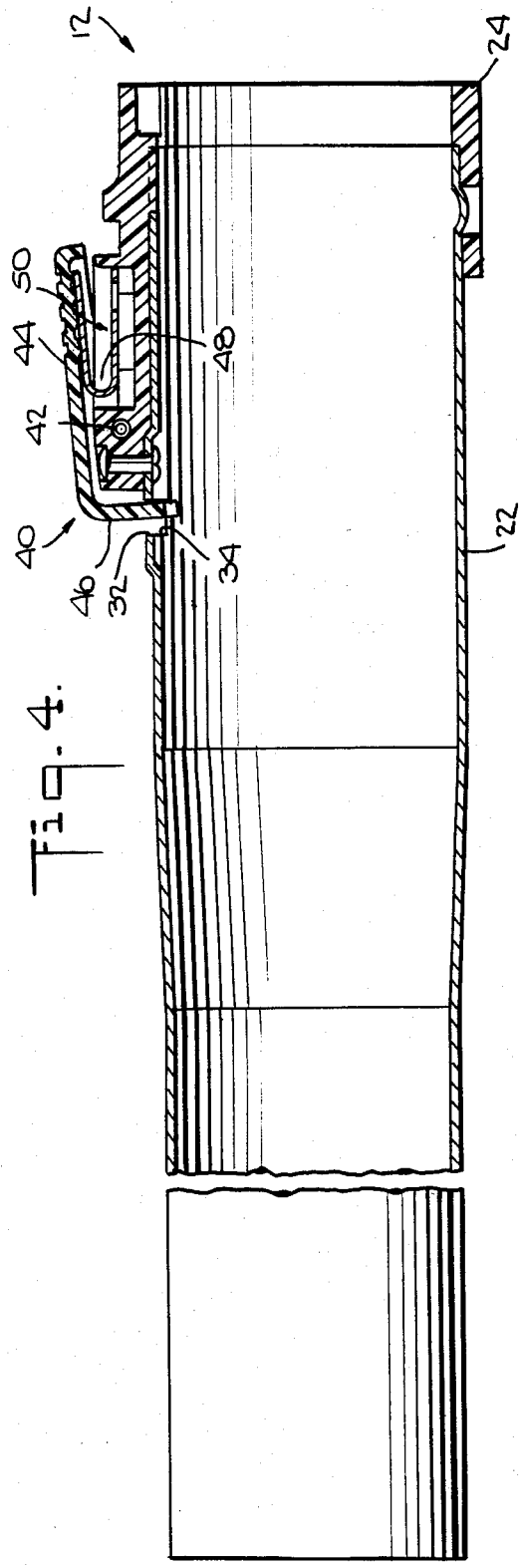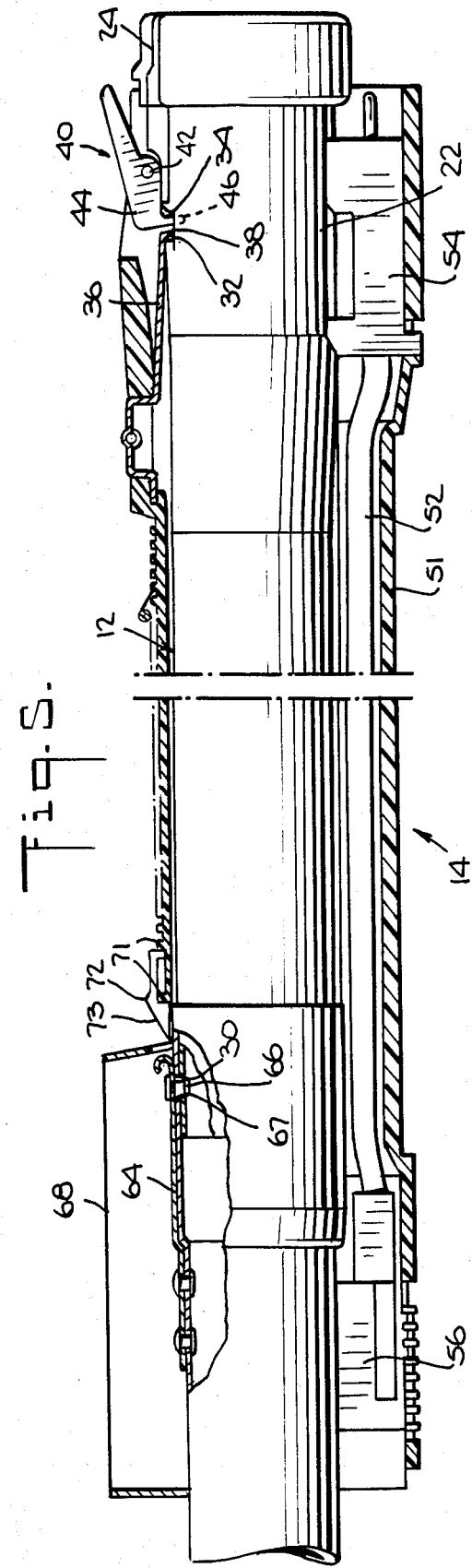

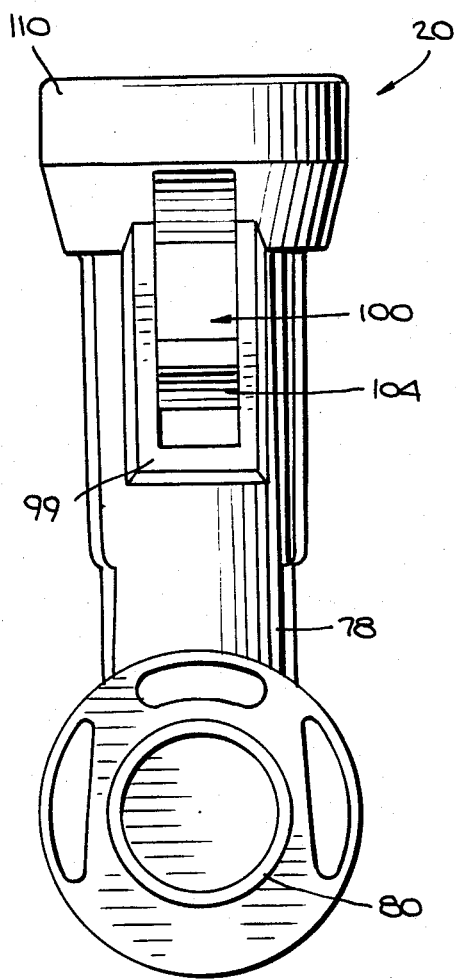
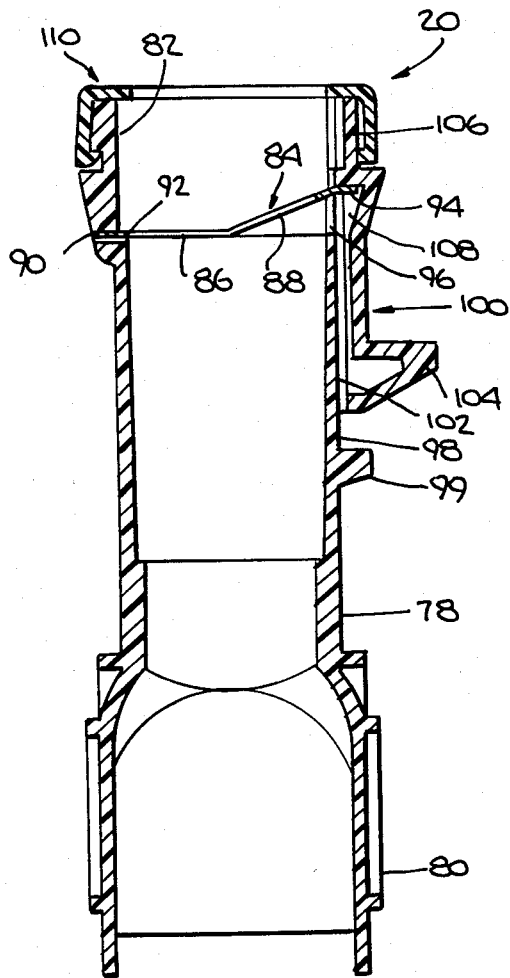
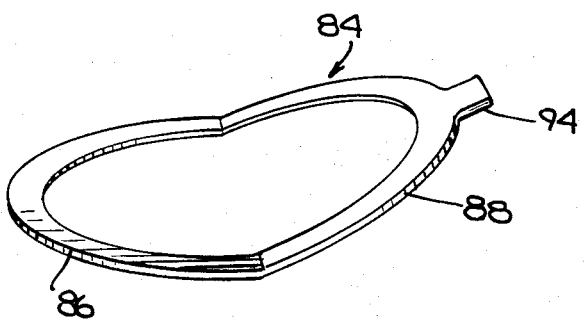

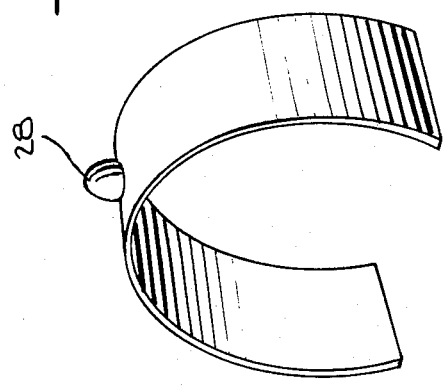
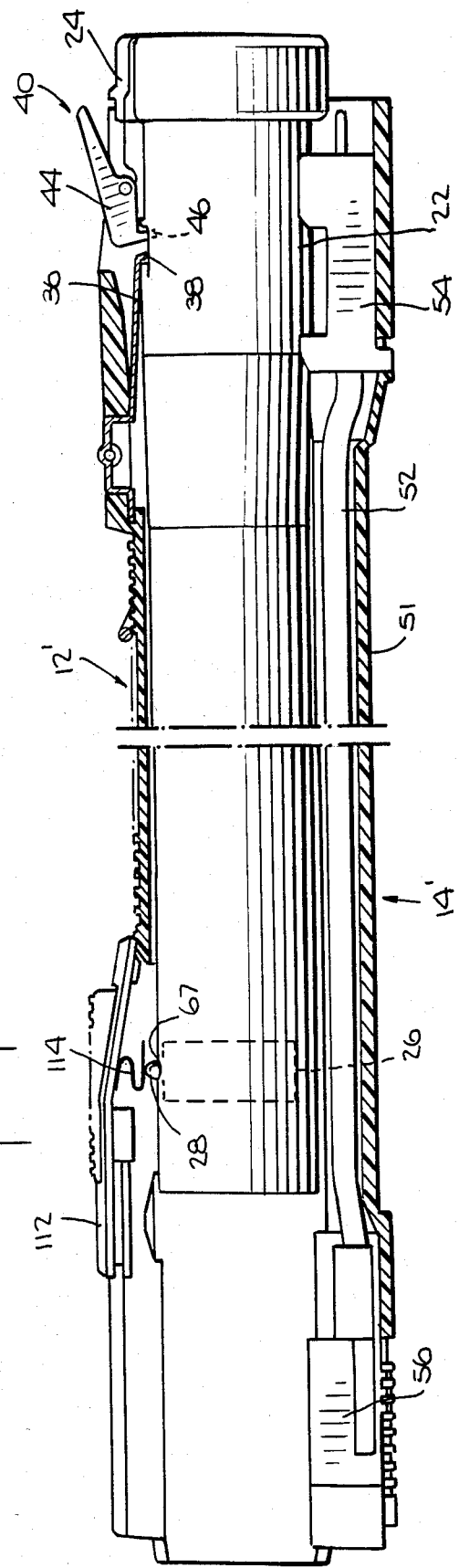

VACUUM CLEANER WAND

One popular type of vacuum cleaner comprises a main body that provides the vacuum suction, and a power nozzle connected to the main body by a wand. The power nozzle has an electric motor which powers a brush to aid in picking up dirt. One type of wand used with power nozzles comprises an upper piece joined to the main body of the vacuum cleaner by a hose, a lower piece connected to the power nozzle and a sheath connecting the upper and lower pieces.

It is one object of the invention to provide a vacuum cleaner wand of the type described having improved mechanisms by means of which the user can, without substantial effort, connect the sheath to the lower piece, and the upper piece to the hose, and equally easily disconnect them.

Another object of the invention is to provide such a wand that is easier to assemble than earlier wands.

Another object is to provide such a wand in which certain of the dimensional tolerances are less critical than in conventional wands.

The invention is an improved wand for connecting a vacuum cleaner and power nozzle. The wand includes a sheath, an upper wand assembly received in the sheath and detachably connected to the vacuum cleaner hose handle, and a lower wand assembly received in the sheath and releasably connected therein to the upper wand assembly. The upper wand assembly includes a tube, preferably metallic, received in the sheath and a unitary cap piece, preferably of plastic, mounted on the end of the tube facing the hose handle. The cap piece: (1) guides the hose handle into engagement with the upper wand assembly; (2) carries and positions a latch to secure the upper wand assembly to the hose handle; and (3) dresses off the end of the upper wand assembly.

The sheath contains an electrical cord to convey power to the power nozzle. A resilient plug body is provided for attachment to the hose handle, to be connected to the cord of the sheath. The plug body contains at least two electrical connectors (i.e., prongs or receptacles) separated by a slot to provide a limited degree of flexibility in the plug body. This insures a good connection despite any possible minor misalignment with the opposing connectors on the sheath cord and reduces the force required to insert or remove the connectors.

The upper end of the lower wand assembly has a leaf spring with a button on its underside to connect to two wand assemblies. The button protrudes through a hole in the lower wand assembly to engage a similar hole in the upper wand assembly. According to one aspect of the invention, the sheath has an axially slidable cam element for sliding under and raising the free end of the spring. Preferably, the cam travel is limited to prevent overbending the spring.

In another version, the wand assemblies are connected by means of an omega spring disposed inside the upper assembly and having a protruding button through holes in both assemblies. In this version, the sheath carries a release level having an S-spring on its underside to depress the omega spring to disconnect the wand assemblies. The S-spring is long enough in the axial direction to fulfill its purpose despite any possible axial misalignment of the wand assemblies with the sheath.

These and other objects and features of the invention will be better understood from a consideration of the following detailed description of several preferred embodiments of the invention, taken in conjunction with the accompanying drawings, in which like reference characters refer to like elements throughout.

FIG. 2 is a detail of FIG. 1, showing the sheath and the upper piece of the wand.

FIG. 3 is a detail of the electrical receptacle disposed on the hose handle.

FIG. 4 is a detail of the upper piece of the wand.

FIG. 5 is a detail of the lower end of the sheath and the lower piece of the wand.

FIG. 6 is a view of a canted spring employed in the power nozzle elbow that receives one end of the lower piece of the wand.

FIGS. 7 and 8 are a side view and a cross-sectional view, respectively, of the power nozzle elbow.

FIG. 9 is a detail of the lower end of the sheath according to a second embodiment of the invention.

FIG. 10 is a perspective view of an omega spring employed in the embodiment of FIG. 9.

Figure 1:
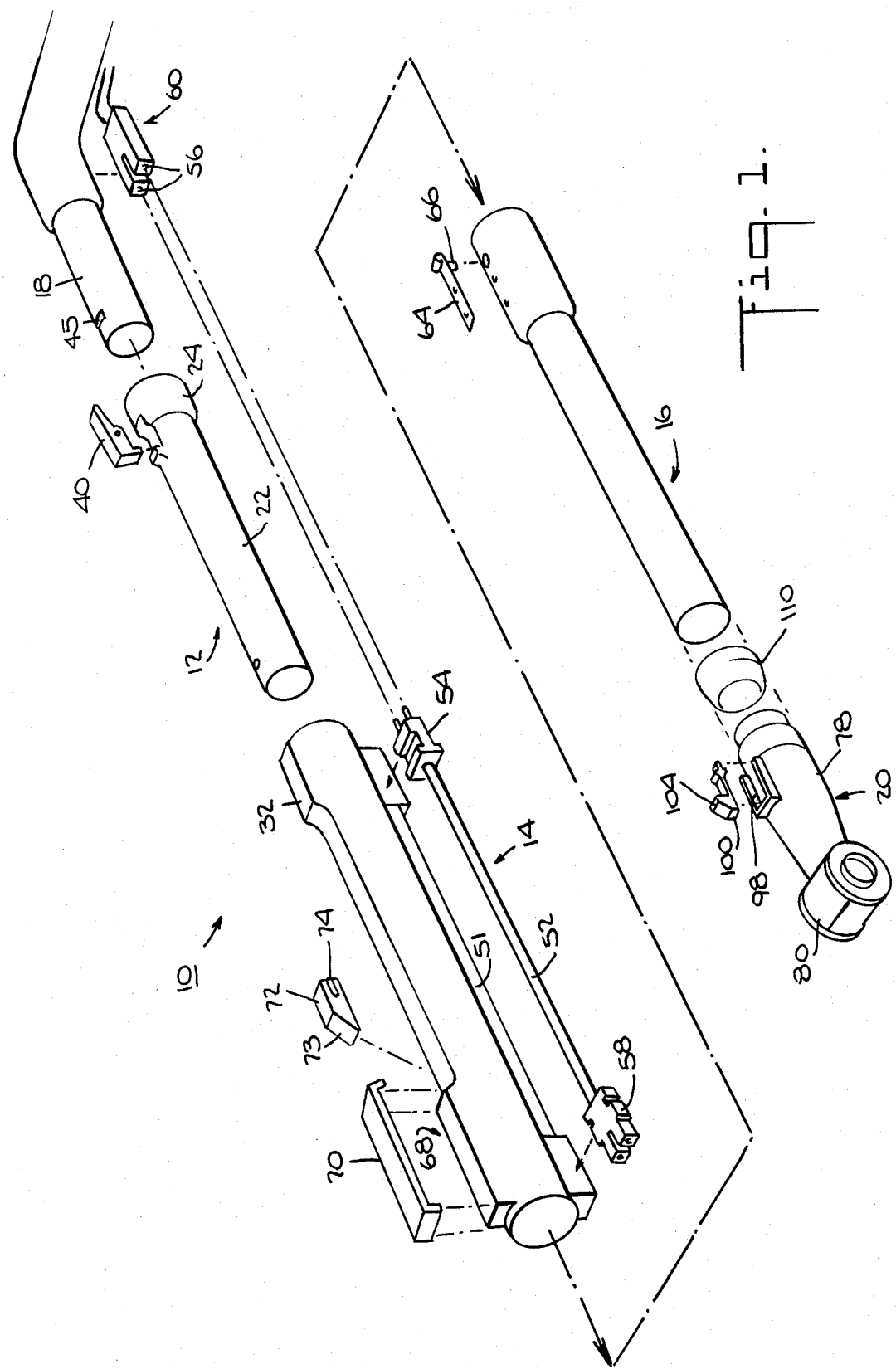
FIG. 1 is an exploded perspective view of one preferred embodiment of the invention.

As shown in FIG. 1, the improved wand 10 of the invention comprises an upper wand assembly 12, a sheath 14 receiving the free (lower) end of the upper wand assembly 12, and a lower wand assembly 15. (Hereinafter, "upper" and "lower" respectively mean nearer to and farther from the main body of the vacuum cleaner.) The upper wand assembly 12 has one end attached to a hose handle 18 that is connected via a hose (not shown) to the main part of the vacuum cleaner (not shown). The other end of the upper wand assembly 12 is received in the sheath 14. The lower wand assembly 16 has its upper end received in the sheath 14 and attached to the upper end wand assembly 12, and its lower end received in the elbow piece 20 of the power nozzle. The power nozzle, except the elbow 20, is not shown.

As shown in FIGS. 1 and 4, the upper wand assembly 12 comprises a metal tube 22 and an annular plastic cap piece 24 mounted by a rivet or any other suitable means on the upper end of the metal tube 22. The metal tube 22 is removably received in the upper end of the sheath 14, and extends nearly to the lower end thereof (see FIG. 2).

The upper end of the sheath 14 has an axial slot 32 extending from the upper end of the sheath. The lower end of slot 32 overlies an approximately rectangular slot 34 in the metal tube 22 of the upper wand assembly 12. A metal spring latch blade 36 having one end secured to the outer surface of the sheath 14 extends axially along the sheath 14 and has a small radial flange 38 at its other end received in the slot 34 of the upper wand assembly 12, retaining the latter in place relative to the sheath 14.

The cylindrical hose handle 18, at the lower end of the hose connected to the main body of the vacuum cleaner, is received in the upper end of the upper wand assembly. To retain the hose handle 18 in the upper wand assembly 12, a latch 40 is mounted on an axially extending portion of the plastic cap piece 24 of the upper wand assembly 12. The latch 40 is mounted to be pivotable about a circumference axis 42 (transverse to the sheath axis), and has a flat surface 44 generally parallel to the sheath axis to be pressed by the user to disconnect the upper wand assembly 12 from the hose handle 18. A radial surface 46 at the lower end of surface 44 extends into the slot 34 as shown. The hose handle 18 has a similar slot 45 that lies directly under slot 34 when the hose handle 18 is in position in the upper wand assembly 12. A well 48 on the outer surface of the cap piece 24 contains a blade spring 50 biasing the radial portion 46 of the latch 40 into the slot 34. Pressing on surface 44 of the latch 40, against the force of the spring 50, disengages the latch 40 from the slot 45 and permits the hose handle 18 to be withdrawn from the upper wand assembly 12.

The plastic cap piece 24 combines three functions otherwise performed by separate parts. The cap piece 24 serves to (1) carry the latch 40, (2) guide the hose handle 18 into the upper wand assembly 12, and (3) dress off the upper end of the upper wand assembly 12 to prevent accidental injury to the user from sharp edges. Use of the unitary cap piece 24 has been found to facilitate quick and reliable assembly of the upper wand piece 12.

The belly of the sheath 14 has an internal trough 51 in which is removably disposed an insulated electrical conductor 52 for supplying power to the power nozzle. The conductor 52 has a male plug 54 at the upper end of the sheath 14 for connection to receptacles 56 (see FIG. 1) on the hose handle 18. The lower end of the conductor 52 has a female plug 58 to be connected to a male plug (not shown) at one end of a cord (not shown) leading to the power nozzle.

To ensure a good electrical connection, the female plug 56 on the hose handle 18 comprises two conventional female receptacles molded in place in a generally oblong, resilient plastic plug body 60 secured to the hose handle by any suitable known means. The receptacles are located side by side at the lower end of the plug body 60, facing the sheath 14. A slot 62 is provided in the plug body 60 between the two receptacles, to provide a certain amount of "give" or "float" between the receptacles. This permits the prongs of the male plug 54 of the conductor 52 to be received accurately in the receptacles despite possible slight misalignment of the prongs. The use of the flexible plug body 60 together with the positive latch 40 to connect the hose handle 18 to the upper wand assembly 12 while maintaining positive locking of the hose handle 18 and upper wand assembly 12, makes if feasible to design the prongs of plug 54 to be inserted into Plug body 60 with minimum effort, unlike certain conventional designs requiring relatively great effort to convert or disconnect the hose handle 18 and upper wand assembly 12.

The upper end of the lower wand assembly 16 is received in the lower end of the sheath 14, the telescopes over the lower end of the upper wand assembly 12. On the outside of the lower wand assembly 16 is a paraxial leaf spring 64 whose lower end is secured, as by riveting, to the lower wand assembly 16. A button or pin 66 provided on the underside of the free end of the spring 64 protrudes through a hole 67 in the tubular wall of the lower wand assembly 16. When the lower wand assembly 16 is received in the sheath 14, the button 66 extends through holes 30 in the upper wand assembly 12, locking the wand assemblies 12, 16 together.

To remove the lower wand assembly 16 from the sheath 14, the free end of the leaf spring 64 must be raised. The lower end of the sheath 14 has a generally oblong portion 68 spaced radially from the wand assemblies in the sheath 14 and located to align the leaf spring 64 when the lower wand assembly 16 is received in the sheath 14. The top of the oblong portion 68 is a cover 70 that conceals the spring 64 and provides a dressed appearance. A stationary cam 69 in portion 68 raises spring 64 on insertion and removal of the lower wand assembly 16 so that button 66 clears the upper wand assembly, in a known manner. A cam element 72 is provided to permit the easy disconnection of the wand assemblies 12, 16 without damage to the spring 64 or to the user's fingernail. The cam element 72 is preferably a block mounted in the oblong portion 68 of the sheath 14 and having a bevelled surface 73 facing the leaf spring 64 to slide under the free end of the latter. The cam 72 preferably has lateral guide pieces 74 on its sides and is preferably mounted in guideways provided for it in the side walls of the oblong portion 68 of the sheath 14. Stop elements 71 in the sheath 14 retain the cam 72 captive in the guideways and limit its travel to prevent overbending the spring 64. When the user pushes the cam 72 axially toward the power nozzle, the cam 72 moves the lower wand assembly 16 a short way out of the sheath 14 to signal the user that the assembly 16 has been released. If desired, the cam element could instead by mounted on the lower wand assembly, but that arrangement would be significantly more complex and expensive than the one illustrated.

As shown in FIGS. 7 and 8, the elbow 20 of the power nozzle comprises two cylindrical bodies 78, 80 intersecting at a right angle to define a "T". The second cylindrical body 80 is pivotally connected in a known manner to the power nozzle body. The interior 82 of the first cylindrical body 78, which receives the lower end of the lower wand assembly 16, is a part of the path by which vacuum suction is provided to the power nozzle from the main body of the vacuum cleaner.

A canted spring 84 is disposed in the upper end of the bore 82 of the first cylindrical body 78. The canted spring 84, shown in more detail in FIG. 6, is generally annular but is bent into two portions 86, 88 lying in planes at an angle to each other. One edge of the spring is received in an aperture 90 in the wall of the elbow and lies against a small shoulder 92 in the elbow bore 82 in such a manner that one portion 86 of the spring 84 is perpendicular to the axis of the elbow 20. The opposite edge 94 of the spring 84 extends obliquely through a longitudinal opening 96 on the opposite side of the elbow bore 82, where the elbow surface 98 is flattened as shown in FIG. 8.

A release 100 is slidably received on the flattened surface 98 of the elbow 20. The release 100 has a first surface 102 in sliding contact with the elbow surface 98, a button portion 104 perpendicular to surface 102 for the user to push, and a tail portion 106. The edge 94 of the oblique portion 88 of the spring is received in a cavity 108 in the release 100 and biases the release 100 axially upward, away from the power nozzle. A cap piece 110 is provided on the upper end of the elbow 20. The tail portion 106 of the release 100 is slidably retained under the cap piece 110, which serves also as a stop for upward axial movement of the release 100.

The lower wand assembly 16 is received in the elbow bore 82 and is retained frictionally by the canted spring 84 in a known manner. To remove the lower wand assembly 16 from the elbow 20, the release 100 is pushed toward the power nozzle, flexing the spring 84 into a planar configuration and releasing the friction between the spring 84 and the lower wand assembly 16. Because the travel of the sliding release 100 is substantially flat on the elbow surface 98 and is limited by stop 99, it is not susceptible to easy damage when actuated by the user's foot, unlike radially-extending releases.

According to another preferred embodiment, a conventional omega spring 26 (see FIG. 10) provided in the lower end of the metal tube 22 has a button or pin 28 protruding through a hole 30 in the upper wand assembly 12, and aids in a manner described below in retaining the lower wand assembly 16 in the sheath 14. A resilient release lever 112 has one end pivotally secured to the sheath 14' and its other end resting on the button 28 of the omega spring 26 of the upper wand assembly 12'. The lower wand assembly 16 has a hole 67 through which the button 28 of the omega spring 26 protrudes when both wand assemblies 12', 16 are received in the sheath 14' and are properly aligned with each other. To release the lower wand assembly 16, the release lever 112 is pressed, depressing the button 28 of the omega spring 26 and allowing the lower wand assembly 16 to be slipped out of the sheath 14'. To reduce the tolerance required in axially aligning the sheath 14' and the upper and lower wand assemblies 12', 16, the release lever 112 has an S-spring 114 mounted on the underside of its free end to engage the button 28 of the omega spring 26. The length of the S-spring 114 makes the exact axial location of the wand assemblies 12', 16 in the sheath 14' less critical than would be the case if a button were provided on the underside of the lever 112 instead of the spring 114.

Although the present invention has been described in detail with reference to two preferred embodiments thereof, many modifications and variations thereof will now be apparent to those skilled in the art. Accordingly, the scope of the invention is to be limited not by the details of the embodiments illustratively described herein, but only by the terms of the appended claims.

We claim:

1. A wand for connecting a vacuum cleaner and a power nozzle, said wand comprising: a sheath having first and second ends; an upper wand assembly removably received in said first end of said sheath, said upper wand assembly being adapted to be detachably connected to a vacuum cleaner; a lower wand assembly having a first end removably received in said second end of said sheath and in releasable locking engagement with said upper wand assembly, and having a second end adapted to be connected to a power nozzle; said upper and lower wand assemblies each having a respective hole formed therein, and said upper wand assembly having an omega spring therein, a portion of said omega spring protruding through said hole of said upper wand assembly and engaging said hole of said lower wand assembly when said lower wand assembly is in said releasable locking engagement with said upper wand assembly; said sheath having release means for releasing said lower wand assembly, said release means comprising an element depressable to force the portion of said omega spring engaging said hole of said lower wand assembly into said upper wand assembly to permit retraction of said lower wand assembly from said sheath, said element having an S-spring for contacting said omega spring.

2. A wand for connecting a vacuum cleaner and a power nozzle, said wand comprising: a sheath having first and second ends; an upper wand assembly removably received in said first end of said sheath, said upper wand assembly having a first end and a second end, said first end of said upper wand assembly being adapted to be detachably connected to a hose handle of such a vacuum cleaner; a lower wand assembly having a first end removably received in said second end of said sheath and in releasable locking engagement with said second end of said upper wand assembly, and having a second end adapted to be connected to a power nozzle; said upper wand assembly having a hole formed therein adjacent said second end thereof; said first end of said lower wand assembly being adapted to be received in said second end of said sheath and telescoped about said second end of said upper wand assembly; leaf spring means having one end secured to said first end of said lower wand assembly and having adjacent its other end a button for engaging said hole in said upper wand assembly for detachably connecting said upper and lower wand assemblies; and cam means adjacent said second end of said upper wand assembly when said upper and lower wand assemblies are in said releasable locking engagement, said cam means being movable axially of said upper wand assembly from a position remote from said other end of said leaf spring means to an axial position between said other end of said leaf spring means and said button and a radial position between said leaf spring means and said upper wand assembly to space said other end of said leaf spring means radially away from said upper and lower wand assemblies to disengage said button from said upper wand assembly.

3. A wand according to claim 2, further comprising latch means for detachably securing and positively locking such a hose handle to said upper wand assembly.

4. The wand of claim 3, wherein said latch means is movable between first and second positions; said latch means while in said first position being located to engage a slot in such a hose handle inserted in said one end of said upper wand assembly for retaining such hose handle therein; and said latch means being relatively remote from said first position while in said second position; and further comprising biasing means urging said latch means into said first position.

5. The wand of claim 2, wherein said cam means is supported by said sheath.

6. The wand of claim 5, wherein said sheath has a portion spaced from the position said wand assemblies occupy when said wand assemblies are received in said sheath, said portion of said sheath having guideways formed in it, and said cam means including guide elements slidably received in said guideways.

7. A vacuum cleaner comprising a main body, a hose having one end connected to said main body and having a hose handle at its other end, a power nozzle, and a wand according to claim 2 connecting said hose handle and said power nozzle.

8. The vacuum cleaner of claim 7, wherein said sheath contains an electrical conductor for supplying electrical power to said power nozzle from said main body of said vacuum cleaner, said conductor having first electrical connector means disposed at said first end of said sheath; said vacuum cleaner further comprising a resilient plug body disposed on said hose handle and containing second electrical connector means; each of said first and second electrical connector means having at least two electrical conductor means; said plug body having a slot separating said at least two electrical conductor means of said second electrical connector means from each other, to provide a degree of flexibility to said plug body.

* * * * *